June 9, 1931.    F. BROCH    1,809,469
DRIVING MECHANISM FOR ROTATING SHAFTS AT VARIABLE SPEED
Filed Feb. 13, 1930
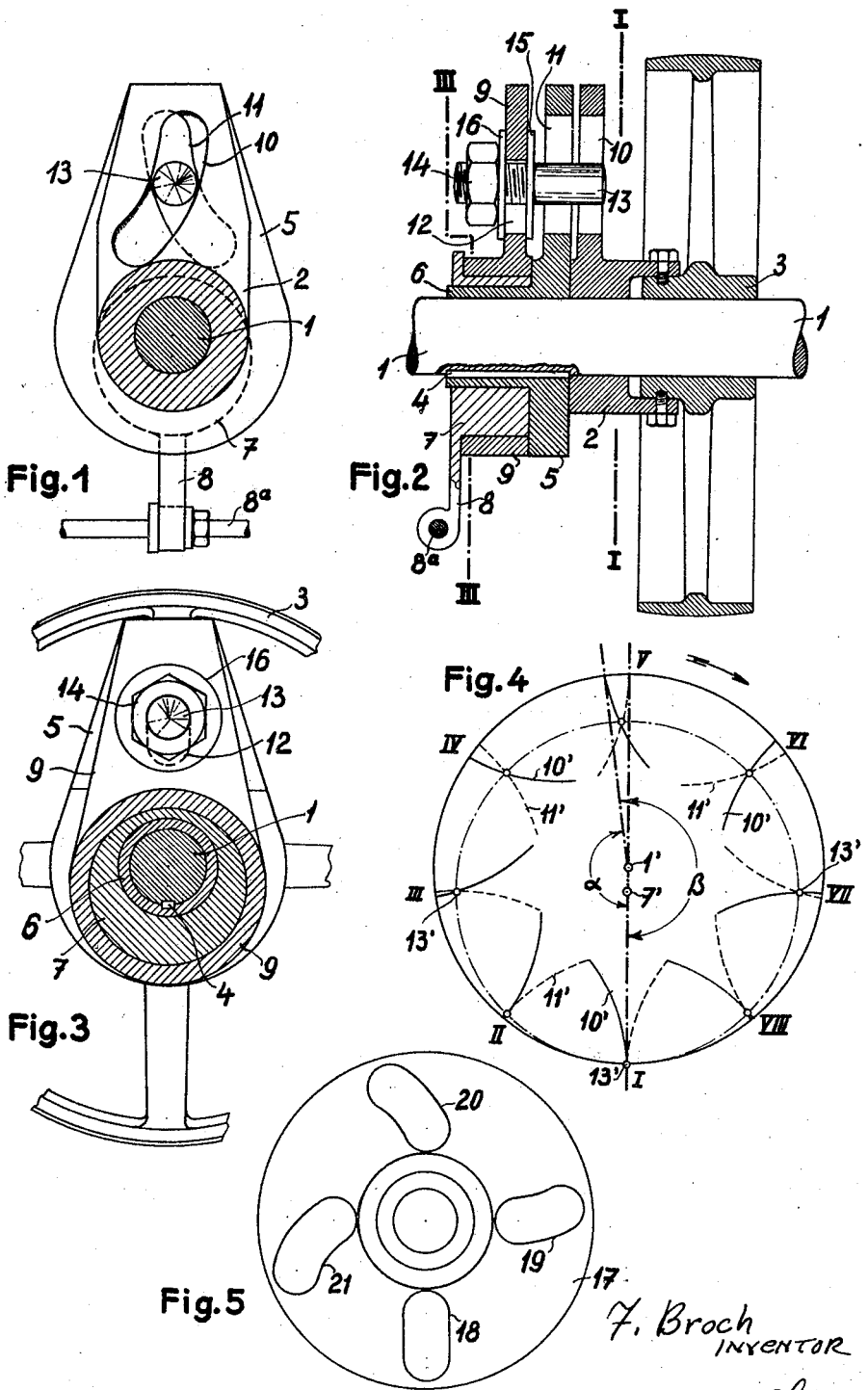
F. Broch INVENTOR
By: Marks & Clark ATTYS.

Patented June 9, 1931

1,809,469

UNITED STATES PATENT OFFICE

FRIEDRICH BROCH, OF VIENNA, AUSTRIA, ASSIGNOR TO TANNWALDER BAUMWOLL-SPINNFABRIK, OF TANNWALD, CZECHOSLOVAKIA, A JOINT-STOCK COMPANY

DRIVING MECHANISM FOR ROTATING SHAFTS AT VARIABLE SPEED

Application filed February 13, 1930, Serial No. 428,181, and in Austria February 20, 1929.

The invention relates to a mechanism for turning shafts at a varying angular speed and particularly for rotating the main shaft of weaving looms, by which shaft an alternating motion is imparted to the lathe (lay, batten) in such manner, that from the middle position it is towards the front moved at a higher speed than backward.

The invention has for its principal object to provide a device, which can easily be mounted on existing normal looms, can be manufactured at a low cost and is only to a reduced extent subject to wear.

According to the invention an arm turning idly at a constant angular speed on the shaft to be driven is coupled to an arm keyed on said shaft by means of a pin or the like, which is guided by slots provided in both of the said arms and is itself controlled by means of an arm journalled eccentrically with respect to the axis of the shaft, so that during one revolution of the shaft the pin is by an oscillatory movement shifted to and fro.

The acceleration of the arm keyed to the shaft during one half of the turning of the idle arm and its retardation during the other half is effected by the co-action of the pin and of the slots. If the pin is, crosswise to its own axis and that of the shaft, shifted in the one direction, the driven arm will be caused to lead in advance of the idle driving arm owing to the pin sliding on the one side wall of the slot constituting an inclined plane, whilst the oscillating movement of the pin in the backward direction causes the driven arm to turn behind the driving arm. By varying the inclination of the slots the extent or degree of said leading and retarding effect can be varied accordingly. Preferably the slots are of a curved form and of a length exceeding that of the path of oscillation of the pin, so that by altering the position of the pin on the eccentrically journalled arm the said relation can be altered according to convenience.

The accompanying drawings show by way of example an embodiment of the invention, Fig. 1 being a sectional view in a plane as indicated by line I—I of Fig. 2, Fig. 2 a longitudinal sectional view and Fig. 3 a section on line III—III of Fig. 2, whilst Fig. 4 is a diagrammatic illustration of the different positions of the slots of said two arms and of the pin after each eighth part of a revolution. Fig. 5 shows a disc, which may be used instead of the idle driving arm.

On the shaft 1, which is to be rotated at varying angular speed and which may for instance be the main shaft of a weaving loom, an arm 2 is idly mounted, which arm is connected to the idle driving pulley 3 itself driven at a constant speed. Adjacent to the arm 2 another arm 5 is by means of a key 4 rigidly secured to the shaft and on the hub 6 of this second arm 5 an eccentric 7 is mounted, which is provided with an extension 8 journalled to the frame of the entire machine by the rod 8a and thus being prevented from turning round with the shaft 1. On the eccentric 7 a third arm 9 is mounted so as to turn idly thereon.

In both the arms 2 and 5 slots 10 and 11 respectively of curved form are provided. The radius of curvature of both these slots decreases with the distance from the shaft 1, that is to say, the outer parts of the slots are less curved than those nearer to the shaft. These two slots 10 and 11 are with respect to the radius inclined in opposite directions. In the third arm 9 a straight slot 12 is provided extending in radial direction. A pin 13 extends through the slots 11, 10 of the arms 5, 2 and is adjustably fastened in the slot 12 of the arm 9 by means of the nut 14. Washers 15 and 16, the diameter of which is greater than the length of the slot 12, are inserted at both sides of the arm 9.

The working of the device can in a more detailed manner be pursued by means of the diagrammatic sketch Fig. 4, in which the middle line of the slot 10 when in the different positions is shown by full lines 10' and that of the slot 11 by dotted lines 11', the axis of the shaft being designated by 1' and the axis of the eccentric 7 by 7'. The crossing points of the full and of the dotted lines are the points, where the pin 13' is positioned in the respective moment.

As is to be seen from this schematic illustration, the pin is during one revolution shifted in radial direction by one oscillatory movement with respect to the axis of the shaft 1. In the position I the pin stands at the outer end of the slots or of its path of oscillation and its distance from the axis of the shaft 1 is the greatest occurring in the course of its movements. If the arm 2 provided with the slot 10 is turned in the direction of the arrow shown in Fig. 4, the pin will, owing to the action of the eccentric, come nearer to the axis of the shaft 1 and thus will cause the slots 10, 11 and consequently also the arms 2 and 5 to come nearer to one another. In the position marked V the arm 2 has already turned for 180°, whilst the arm 5 has only been turned for the angle $\alpha$, which is smaller than 180°. Consequently in the first half of the revolution of the arm 2 the rotative speed of the arm 5 and of the shaft 1 is retarded. During the further course of rotation of the arm 2 from the position V into the position VI and further on the pin 13 will drive the slots asunder until it will have reached again the position I. The angle of rotation of the arm 2 between the positions V and I amounts to 180°, whilst the angle $\beta$ described by the arm 5 is greater than 180°. Consequently during the second half of the rotation of the arm 2 the rotary movement of the arm 5 is accelerated.

The degree of retardation and acceleration of the arm 5 depends upon the curved form of the slots 10 and 11. The angle $\alpha$ will be the smaller and the angle $\beta$ the greater, the more curved the slot parts are, on which the pin slides during its oscillatory motion from the position I into the position V and back. Consequently the variation of the speed of the shaft 1 can be augmented by fastening the pin 13 on the arm 9 nearer to the shaft, so that it will engage with the more curved parts of the slots 10 and 11. From Fig. 4 it can also be easily understood that the effect aimed at is also obtained, if one of the two slots 10 and 11 is straight and disposed in radial direction, although in such case the degree of variation of the rotative speed is diminished.

Moreover an adjustment of the degree of variation can also be effected in the case of the pin 13 being permanently secured to the arm 9, if several arms 2 are kept in stock, the slots 10 of which show different curvatures. In such case for altering the degree of variation the arm 2 is to be exchanged. The arm 2 may also be replaced by a disc 17 as shown by Fig. 5, in which disc several slots, 18, 19, 20, 21 of different curvature are provided. According to the desired degree of variation of speed the disc is applied so that the one or the other of its slots engages with the pin 13 and then it is coupled to the driving pulley.

What I claim is:

1. A driving mechanism for rotating shafts at a variable speed, which mechanism consists of a slotted arm idly mounted on the shaft to be driven and coupled to a driving member, another slotted arm, rigidly secured to the shaft and a third arm idly mounted on a fixed eccentric and carrying a pin, which extends through the two slots of the first mentioned arms, at least one of the said slots being inclined with respect to the radius passing through the respective slot.

2. A driving mechanism for rotating shafts at a variable speed, which mechanism consists of a slotted arm idly mounted on the shaft to be driven and coupled to a driving member, another slotted arm, rigidly secured to the shaft and a third arm idly mounted on a fixed eccentric and carrying a pin, which extends through the two slots of the first mentioned arms, the said two slots being in opposite directions inclined with respect to the radius passing therethrough.

3. A driving mechanism for rotating shafts at a variable speed, which mechanism consists of a slotted arm idly mounted on the shaft to be driven and coupled to a driving member, another slotted arm, rigidly secured to the shaft and a third arm idly mounted on a fixed eccentric and carrying a pin, which extends through the two slots of the first mentioned arms, at least one of the said slots being inclined with respect to the radius and curved.

4. A mechanism for driving a shaft at a varying speed of rotation, which mechanism consists of a slotted arm idly mounted on the shaft to be driven and connected to a driving member, a second slotted arm, which is rigidly keyed to the said shaft, a third arm idly mounted on a fixed eccentric and having a slot, in which a pin is adjustably fastened, this pin being disposed so as to extend through the two slots of the first mentioned arms and at least one of these slots being inclined with respect to the radius.

5. A mechanism for driving a shaft at a varying speed of rotation, which mechanism consists of a slotted arm idly mounted on the shaft to be driven and connected to a driving member, a second slotted arm, which is rigidly keyed to the said shaft, a third arm idly mounted on a fixed eccentric and having a slot, in which a pin is adjustably fastened, this pin being disposed so as to extend through the two slots of the first mentioned arms and at least one of these slots being inclined with respect to the radius and being curved with a changing radius of curvature.

In testimony whereof I have signed my name to this specification.

FRIEDRICH BROCH.